No. 681,450. Patented Aug. 27, 1901.
A. V. GROUPE.
BRAIDING MACHINE.
(Application filed Dec. 20, 1900.)
(No Model.) 3 Sheets—Sheet 1.
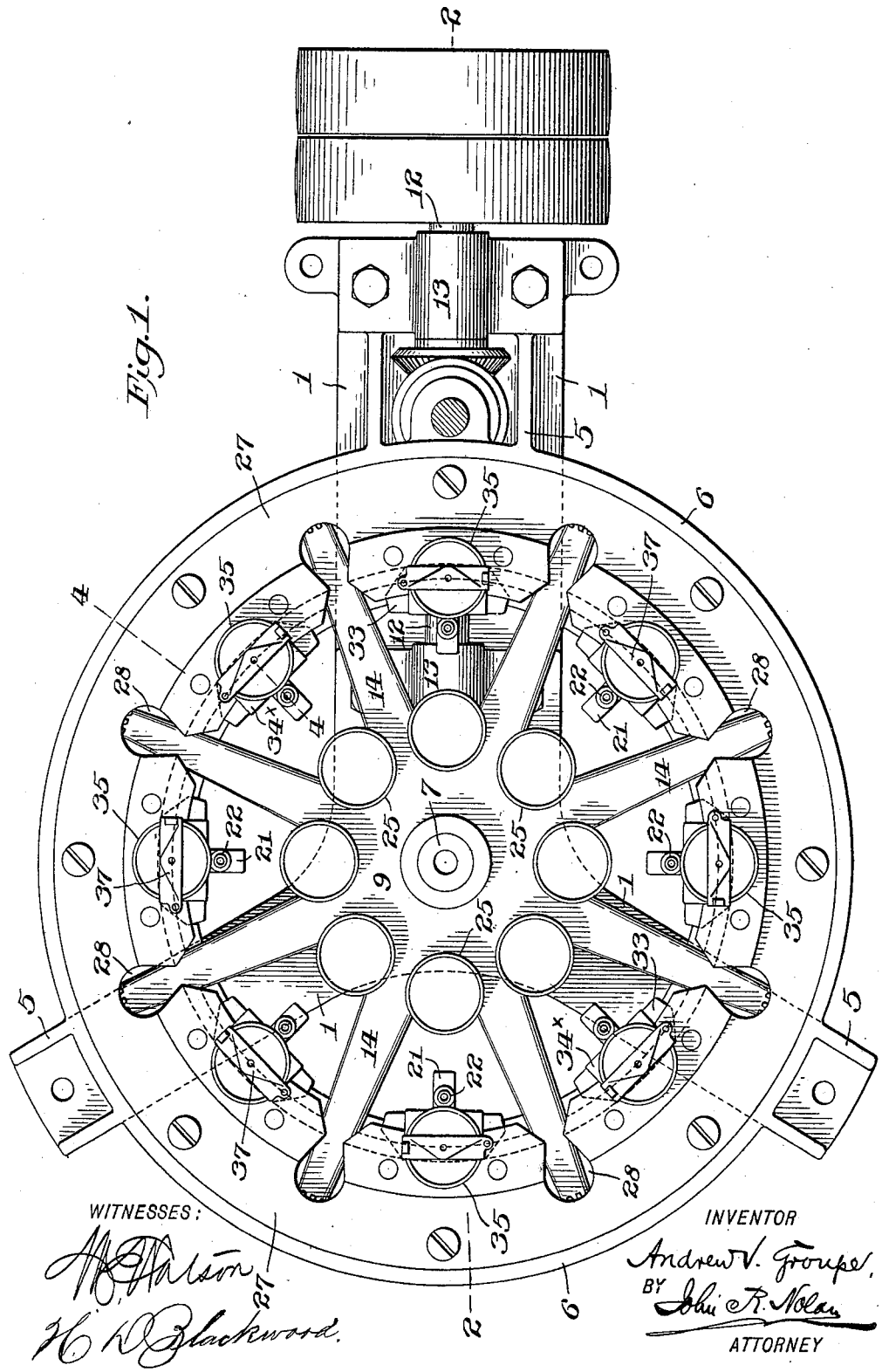

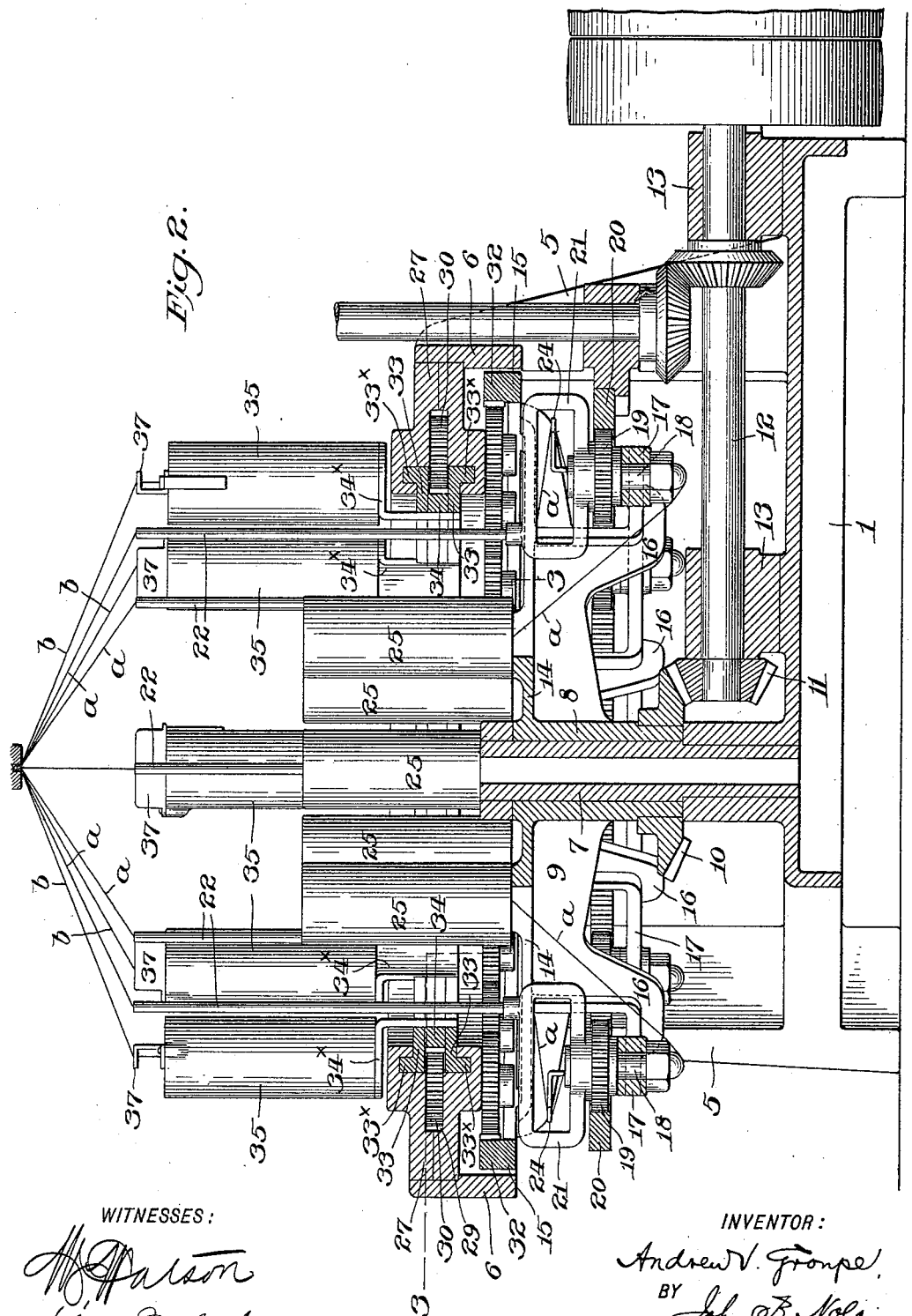

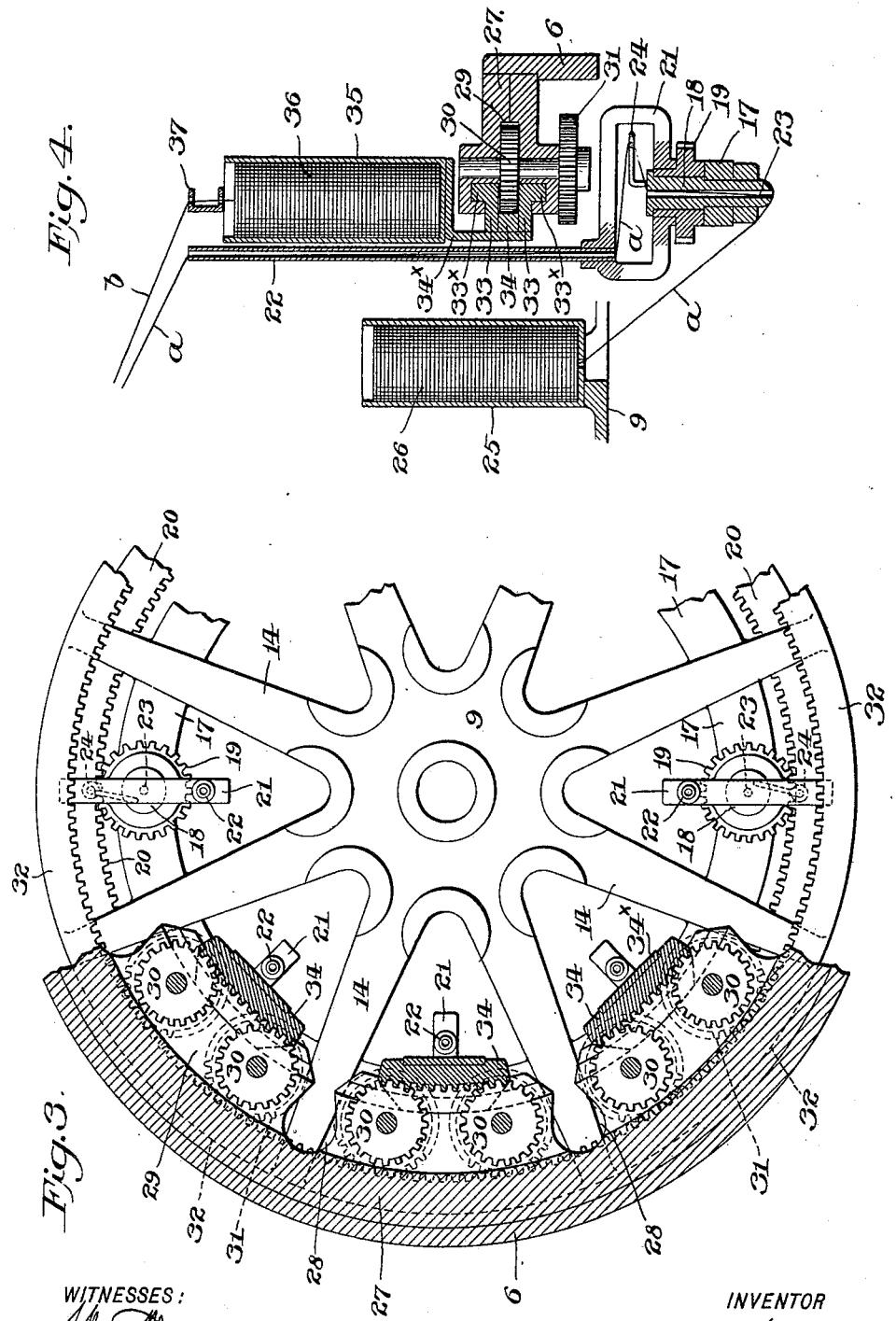

UNITED STATES PATENT OFFICE.

ANDREW V. GROUPE, OF MOORE, PENNSYLVANIA, ASSIGNOR OF ONE-HALF TO LORENZ R. SCHWERIN, OF PHILADELPHIA, PENNSYLVANIA.

BRAIDING-MACHINE.

SPECIFICATION forming part of Letters Patent No. 681,450, dated August 27, 1901.

Application filed December 20, 1900. Serial No. 40,500. (No model.)

*To all whom it may concern:*

Be it known that I, ANDREW V. GROUPE, a citizen of the United States, residing at Moore, in the county of Delaware and State of Pennsylvania, have invented certain new and useful Improvements in Braiding-Machines, of which the following is a full, clear, and exact description, reference being had to the accompanying drawings, forming a part of this specification.

This invention relates to that class of braiding-machines wherein the threads from oppositely-traveling sets of thread-carriers are interlaced to effect the braiding of the threads about a central point, and more particularly to that type of such machines in which the said carriers are rotated in concentric paths and the threads from one set directed about those of the other set.

The object of my invention is to provide a machine of novel construction wherein the movement of the braiding mechanism—that is, the mechanism particularly concerned in the interlacing or plaiting of the threads—shall be entirely rotary as distinguished from reciprocatory, whereby rapidity and efficiency of operation, together with durability, simplicity, and compactness of construction, shall be attained, as will be hereinafter fully set forth.

In the drawings, Figure 1 is a plan view of a braiding-machine embodying my invention. Fig. 2 is a longitudinal vertical section as on the line 2 2 of Fig. 1. Fig. 3 is a partial horizontal section as on the line 3 3 of Fig. 2. Fig. 4 is a partial vertical section as on the line 4 4 of Fig. 1.

The main frame comprises a bed 1, uprights 5 rising therefrom, and a ring 6, supported by the uprights, the whole being preferably, though not essentially, an integral structure. Rising fixedly from the bed centrally of the ring is a hollow post 7, upon which is rotatably mounted the hub 8 of a spider 9. This hub is provided with a bevel-wheel 10, which coacts with a similar wheel 11 on a main driving-shaft 12, having its bearings in suitably-disposed boxes 13 on the main frame, whereby during the operation of the shaft the said spider is positively and continuously rotated.

In the present instance the spider comprises a series of arms 14, radiating from the hub to an outer encircling concentric ring 15. These arms are provided with depending portions 16, carrying a smaller ring 17, which lies below and concentric with the ring 15. Fixed to the lower ring at regular intervals apart are vertical studs 18, on which are revolubly mounted pinions 19. These studs are conveniently arranged intermediate the adjacent arms of the spider. The teeth of the pinions mesh with those of an internal gear-ring 20, formed on or fixedly secured to the uprights of the main frame, whereby during the rotation of the spider the pinions are simultaneously rotated about their respective axes at a uniform rate of speed.

Affixed to the hub of each of the pinions 19 is a thread-guide comprising a frame 21, carrying a vertical tube 22 or the like, which during the rotation of the pinion describes an epicycloidal path. The studs have axial openings 23 therein and support thread-guiding arms 24, which lie within the respective frames 21. The threads *a* from one set of bobbins are drawn up through these openings, thence through the eyes of the arms 24, thence up through the tubes, and thence to the braiding-point. This set of bobbins is conveniently supported upon the spider. In the present instance a series of cylindrical cases 25 are mounted on the spider, and the bobbins or bodies of thread 26 are loosely contained within the cases, the threads being drawn through eyes in the bottoms of their cases and being passed to and through the axial openings of the respective studs 18. The other set of bobbins is mounted to travel in a circular path, which is intersected by the path traversed by the guide-tubes 22. This second set of bobbins is rotated in a direction contrary to that of the other set to the end that the two sets of oppositely-moving threads are interlaced to effect their braiding at the central or braiding point. A simple and efficient means whereby the second set of bobbins is supported and rotated is as follows: On the ring 6 of the main frame is rigidly supported a two-part ring 27, provided in its inner edge at regular intervals apart with recesses 28, which afford spaces for the passage of the guide-tubes as they intersect the circular path of the bobbins. Between the two parts of this ring is formed an annular space 29, in which are contained pinions 30, arranged in pairs, one pair being disposed between each adjacent pair of recesses. The shafts of these pinions extend through and below the lower section of the ring 27 and carry pinions 31, which coact with an internal gear-ring 32, formed on (or secured to) the upper ring 15 of the spider, whereby during the rotation of the latter the pinions and their shafts are simultaneously driven at a uniform rate of speed.

A carrier is provided for each of the upper bobbins. This carrier in its preferred construction comprises two segmental plates 33, with an interposed gear-segment 34, with which the pinions 30 coact in a manner to rotate the carrier in a circular path, the plates 33 being provided with ribs or projections 33$^\times$, that are fitted to annular guideways in the opposing walls of the respective parts of the recessed ring 27. The carriers are mounted at regular distances apart and are maintained and driven in this relation by the series of rotating pinions 30, the timing of the several mechanisms being such that the carriers cross and pass the mouths of the several recesses 28 while the guide-tubes are moving within the latter.

Affixed to the respective carriers are brackets 34$^\times$, upon which are supported cylindrical cases 35, in which bobbins or bodies of thread 36 are loosely contained. The threads $b$ from the latter are drawn through guides 37 at the tops of the respective casings and directed therefrom to the central or braiding point.

By the foregoing described construction it will be seen that the two sets of bobbins are supported and rotated in annular paths in opposite directions to each other, that the guide-tubes through which pass the threads from one set of bobbins are rotated about their own axes and also in the same direction as such bobbins, or, in other words, in an epicycloidal path, and that such path at predetermined intervals intersects the annular path traversed by the other set of bobbins, thereby effecting the interbraiding of the two sets of threads. Thus the braiding mechanism is free from reciprocating parts, and in consequence rapidity and efficiency of operation, together with durability, simplicity, and compactness of construction, are attained.

While I have herein shown and described what I believe to be the best and most efficient embodiment of my invention, yet I do not wish to be understood as limiting myself to the specific construction and arrangement of parts set forth.

I claim—

1. In a braiding-machine, the combination with two sets of thread-supplying devices, and means for supporting and rotating them in annular paths, in opposite directions to each other, such paths being concentric to the axis of the machine, of means whereby the threads from one set of devices are guided in an epicycloidal path intersecting the path of the other set of devices, whereby a braiding operation is effected without reciprocating movements.

2. In a braiding-machine, the combination with two sets of thread-supplying devices, and means for supporting and rotating them in annular paths, of a series of guides for the threads from one set of devices, and means whereby the said guides are supported and rotated in an epicycloidal path intersecting at predetermined points the annular path of the other set of devices.

3. In a braiding-machine, the combination with two sets of thread-supplying devices, and means for supporting and rotating them in annular paths, in opposite directions to each other, of a series of thread-guides, means for bodily rotating the series, and means for independently rotating each of said guides during the bodily rotation of said series.

4. In a braiding-machine, the combination with a support, means for rotating the same, a set of thread-supplying devices on said support, a corresponding set of thread-guides on said support, and means for independently rotating said guides during the rotation of said support, of a second set of thread-supplying devices, and means for supporting and rotating the same.

5. In a braiding-machine, the combination with a support, means for rotating the same, a set of thread-supplying devices on said support, a corresponding set of thread-guides on said support, and means for independently rotating said guides during the rotation of said support, of a series of carriers, a set of thread-supplying devices thereon, and means for rotating said carriers in an annular path intersected at predetermined points by the said thread-guides.

6. In a braiding-machine, the combination with a support, means for rotating the same, a set of thread-supplying devices on said support, perforated studs on said support, guides connected with said studs and adapted to receive and guide the threads from said devices, and means for independently rotating the said guides during the rotation of the said support, of a series of carriers, thread-supplying devices thereon, and means whereby the said carriers are rotated in a path intersected at certain points by said guides.

7. In a braiding-machine, the combination with a support, means for rotating the same, a set of thread-supplying devices on said support, perforated studs on said support, pinions on said studs, guides for the threads from said devices, and a gear-ring with which the pinions coact, of a series of carriers, thread-supplying devices thereon, and means whereby the said carriers are rotated in a path intersected at certain points by the said guides.

8. In a braiding-machine, the combination with a support, means for rotating the same, a set of thread-supplying devices on said support, perforated studs on said support, pinions on said studs, guides for the threads from said devices, and a gear-ring with which the pinions coact, of a series of carriers including gear-segments, thread-supplying devices on said carriers, a gear-ring, and gearing coacting therewith and with the said gear-segments.

In testimony whereof I have hereunto affixed my signature in the presence of two subscribing witnesses.

ANDREW V. GROUPE.

Witnesses:
 EDWARD I. TOOLE,
 JOHN J. SHARKEY.